(12) United States Patent
Chung et al.

(10) Patent No.: US 8,773,878 B2
(45) Date of Patent: Jul. 8, 2014

(54) THREE-PHASE REACTOR POWER SAVING DEVICE

(75) Inventors: Yi Ju Chung, Hsinchu County (TW); Chia Hsien Pu, Hsinchu County (TW)

(73) Assignee: Rong Shin Jong Co., Ltd., Hsinchu County (TW)

( * ) Notice: Subject to any disclaimer, the term of this patent is extended or adjusted under 35 U.S.C. 154(b) by 0 days.

(21) Appl. No.: 13/603,714

(22) Filed: Sep. 5, 2012

(65) Prior Publication Data

US 2013/0314962 A1 Nov. 28, 2013

(30) Foreign Application Priority Data

May 24, 2012 (TW) .............................. 101118502 A

(51) Int. Cl.
*H02M 7/06* (2006.01)
*H02J 3/36* (2006.01)
*H02M 5/45* (2006.01)

(52) U.S. Cl.
USPC ............................................ 363/125; 363/35

(58) Field of Classification Search
USPC ............... 363/34, 35, 37, 39, 44, 85, 89, 125, 363/127, 126, 131, 132, 135, 136, 137
See application file for complete search history.

(56) References Cited

U.S. PATENT DOCUMENTS

| 5,345,375 A * | 9/1994 | Mohan ............................ 363/40 |
| 7,800,348 B2 * | 9/2010 | Zargari ......................... 323/207 |
| 8,325,501 B2 * | 12/2012 | Torrico-Bascope ............ 363/47 |
| 2006/0056207 A1 * | 3/2006 | Sarlioglu ........................ 363/44 |

* cited by examiner

*Primary Examiner* — Gary L Laxton
(74) *Attorney, Agent, or Firm* — Rosenberg, Klein & Lee

(57) ABSTRACT

A three-phase reactor power saving device, comprising: a first capacitor set, connected electrically to a three-phase AC power supply, to store electric energy; a reactor set, connected electrically to said first capacitor set, to convert said electric energy into AC self-induced energy; a three-phase transformer, connected electrically to said reactor set, to boost said AC self-induced energy into boosted AC self-induced energy; a second capacitor set, connected electrically to said three-phase transformer, to store said boosted AC self-induced energy; a rectifier circuit, connected electrically to said three-phase transformer, to rectify current of said boosted AC self-induced energy into a DC current; a power regulating capacitor, connected electrically to said rectifier circuit; and a first DC reactor and a second DC reactor, connected electrically to said rectifier circuit, to output first DC self-induced energy and second DC self-induced energy to said load, to raise power saving efficiency.

19 Claims, 3 Drawing Sheets

THREE-PHASE REACTOR POWER SAVING DEVICE

BACKGROUND OF THE INVENTION

1. Field of the Invention

The present invention relates to a reactor power saving device, and in particular to a three-phase reactor power saving device.

2. The Prior Arts

Along with the rapid economic growth, the demand for electric energy is increasing, thus accelerating the energy crisis. The shortage of energy supply has driven up the price of electricity to adversely affect the economic growth, in particular, for the petroleum and other energy resources, the impact of their shortage is quite severe. Therefore, the developments of clean green energy and power saving device have become two important subjects for the green energy Industry worldwide.

Presently, for the energy saving/power saving device, a micro-controller is used to detect if a human body is in a room through at least an infrared human body sensor. In case the answer is negative, it shuts down the power supply to the indoor illumination through a light switch. Otherwise, it further detects the luminance of natural light in the room by means of a luminance sensor. If the illumination exceeds a predetermined value, it will then shut down the power supply to the indoor illumination. Or alternatively, power consumption can be reduced by turning-on or turning-off lights in a predetermined time. However, for these approaches of power saving mentioned, above, they are done manually; namely, either a person has to walk to the energy saving/power saving device, for it to sense the human body; or a person must turn-off the switch to effect power saving, and the next time when he wants to use the power, he has to walk to the power saving device to turn-on the switch again. However, the complicated turning-on and turning-off processes could cause quite inconvenience in usage. Moreover, for this kind of power saving, the switch is set up and operated by a user, it can hardly achieve real power saving efficiently.

Therefore, presently, the design and performance of power saving device of the prior art is not quite satisfactory, and it has much room for improvements.

SUMMARY OF THE INVENTION

In view of the problems and shortcomings of the prior art, the present invention provides a three-phase reactor power saving device, that can be utilized in all the resistive, capacitive, and inductive loads of the industrial equipment and household appliances to save power, to solve the drawbacks of the prior art.

A major objective of the present invention is to provide a three-phase reactor power saving device, that is realized by using the design of a DC reactor and a three-phase transformer, to produce magneto-electric effect. The three-phase reactor power saving device is capable of saving power, reducing power consumption of the load, and raising the overall quality and performance of the power supply.

Another objective of the present invention is to provide a three-phase reactor power saving device, that utilizes a rectifier circuit to rectify the current of the boost-type AC self-induced energy released by a three-phase transformer, such that the present invention is able to reduce the capacity required for the power input equipment of a motor. Meanwhile, it can reduce compensation power for the circuit current, and enhance the optimization of reactor rectification.

Another objective of the present invention is to provide a three-phase reactor power saving device, for which the addition of a capacitor could offset part of the reactive power (KVAR), raise the active power (KW), increase power factor, and reduce the total power consumption (KVA), so that it can be used widely in the various loads of the industrial equipments and household appliances to save power. In addition, the three-phase reactor power saving device of the present invention is capable of meeting the power factor specifications of Power Company, that its power factor not lower than 80% of current lagging power factor.

A further objective of the present invention is to provide a three-phase reactor power saving device, such that through the addition of a three-phase inverter circuit, the three-phase reactor power saving device is able to convert the three-phase DC current to an AC current. Therefore, it can be used in a DC load as well as an AC load. Also, in addition to the newly added three-phase inverter circuit, a reactor having ferrite inductance is selected, to enable conversion to the maximum DC current. In such an approach, the present invention integrates power supply systems of various functions, such as active power rectifier (APF) and power factor corrector (PFC), to provide DC driving power, and improve power supply quality to achieve power saving.

A yet another objective of the present invention is to provide a three-phase reactor power saving device, to reduce the line impedance, raise overall quality and effectiveness. Since the circuit current is decreased, thus the voltage drop is reduced, so it can provide more stable power, reduce equipment cost, and prolong its service life. Moreover, it can improve voltage conversion rate, and provide power to the loads of various equipments. When the three-phase reactor power saving device is placed close to the main switch, its power supply efficiency is increased. When it is used in a switch of a power distribution panel to match with the load, the power factor of the entire power supply is raised.

In order to achieve the above-mentioned objective, the present invention provides a three-phase reactor power saving device, that is used to receive three-phase AC power supply, and is connected electrically to the load. The three-phase reactor power saving device includes: a first capacitor set, a reactor set, a three-phase transformer, a second capacitor set, a rectifier circuit, a power regulating capacitor, and a first DC reactor and a second DC reactor. Wherein, the first capacitor set is connected electrically to a three-phase AC power supply, to store electric energy. The reactor set is connected electrically to the first capacitor set, to receive and convert the electric energy into AC self-induced energy. The three-phase transformer is connected electrically to the reactor set, to receive and boost the AC self-induced energy into boosted AC self-induced energy. The second capacitor set is connected electrically to the three-phase transformer, to store the boosted AC self-induced energy. The rectifier circuit is connected, electrically to the three-phase transformer, to rectify a current, of the boosted AC self-induced energy into a DC current. The power regulating capacitor is connected electrically to the rectifier circuit, to store the power of the DC current. The first DC reactor and the second DC reactor are connected electrically to the rectifier circuit to receive the DC current, and to generate and output the first DC self-induced energy and second DC self-induced energy to the load.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The related drawings in connection with the detailed description of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed description with reference to the attached drawings. And, in the following, various embodiments are described in explaining the technical characteristics of the present invention.

Figure 1:
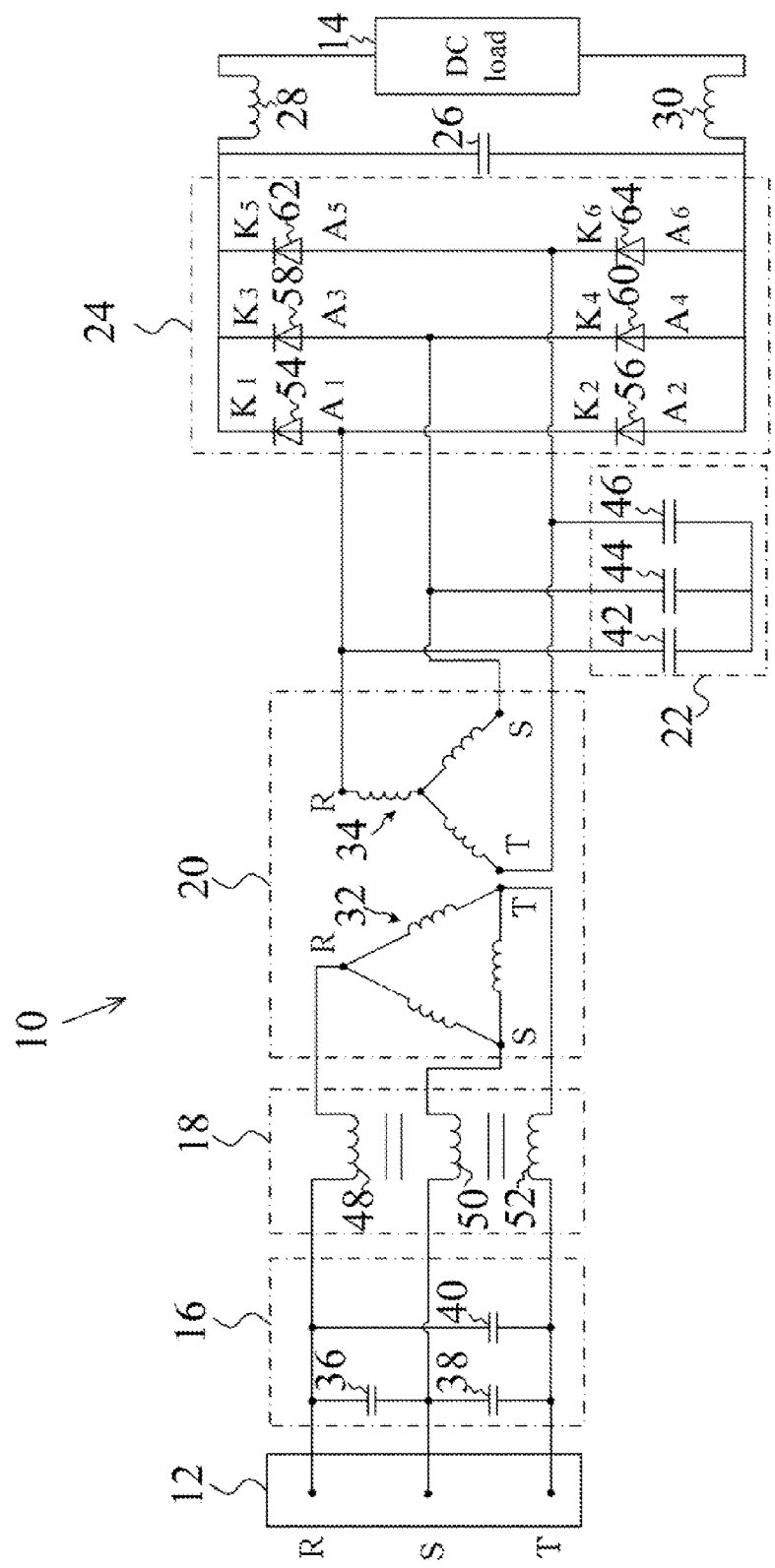
FIG. 1 is a circuit diagram of a three-phase reactor power saving device according to an embodiment of the present invention.

In the following, an embodiment is described to explain the principle of operation of the present invention. Firstly, refer to FIG. 1 for a circuit diagram of a three-phase reactor power saving device according to an embodiment of the present invention. As shown in FIG. 1, the three-phase reactor power saving device 10 receives a three-phase AC power supply 12 having a first R phase, a first S phase, and a first T phase, and is connected electrically to a DC load 14, such that the three-phase AC power supply 12 carries with it electric energy. The three-phase reactor power saving device 10 includes: at least a first capacitor set 16, connected electrically to the three-phase AC power supply 12, to store the electric energy; a reactor set 18, connected electrically to the first capacitor set 16, to receive and convert the electric energy into AC self-induced energy.

Moreover, the three-phase reactor power saving device 10 further includes a three-phase transformer 20, connected electrically to the reactor set 18, to receive and boost the AC self-induced energy into boosted AC self-induced energy; the second capacitor set 22, connected electrically to the three-phase transformer 20, to store the boosted AC self-induced energy; the rectifier circuit 24, connected electrically to the three-phase transformer 20, to rectify the current of the boosted AC self-induced energy into a DC current; the power regulating capacitor 26, connected electrically to the rectifier circuit 24, to store power of the DC current; and the first DC reactor 28 and the second DC reactor 30, connected electrically to the rectifier circuit 24 to receive DC current, and generate and output the first DC self-induced energy and the second DC self-induced energy to the DC load 14.

As mentioned earlier, the DC load 14 can be a resistive load, an inductive load, or a capacitive load, and is connected electrically to a first DC reactor 28 and a second DC reactor 30 to form a loop. The DC load 14 receives the first DC self-induced energy and the second DC self-induced energy.

The three-phase transformer 20 is provided with an iron core and a coil, such that the iron core is made of a silicon steel plate. The three-phase transformer 20 can be a Δ-Y line-connected transformer, so that the third harmonic waves can circulate inside Δ, the voltage wave will not deform, and the secondary side voltage is $\sqrt{3}$ times the phase voltage. The three-phase transformer 20 is provided with a Δ connection line 32 and Y connection line 34. The Δ connection line 32 is provided with a second R phase, a second S phase, and a second T phase. The Y connection line 34 is provided with a third R phase, a third S phase, and a third T phase. The three-phase transformer 20 is a high power three-phase transformer, having an iron core and a coil, such that the iron core is made of a silicon steel plate.

The first capacitor set 16 includes: a first capacitor 36, connected electrically to a first R phase and a first S phase; a second capacitor 38, connected electrically to the first S phase and a first T phase; and a third capacitor 40, connected electrically to the first S phase and the first T phase.

The second capacitor set 22 includes: a fourth capacitor 42, connected electrically to a third R phase; a fifth capacitor 44, connected electrically to the third S phase and the fourth capacitor 42; a sixth capacitor 46, connected electrically to a third T phase and a fifth capacitor 44. Wherein, the first capacitor 36, the second capacitor 38, the third capacitor 40, the fourth capacitor 42, the fifth capacitor 44, and the sixth capacitor 46 are all power capacitors.

The reactor set 18 includes: a first reactor 48, connected electrically to the first capacitor 36, the third capacitor 40, and the second R phase; a second reactor 50, connected electrically to the first capacitor 36, the second capacitor 38, and the second S phase; and a third reactor 52, connected electrically to the second capacitor 38, the third capacitor 40, and the second T phase.

As mentioned earlier, the first DC reactor 28, the second DC reactor 30, the first reactor 48, the second reactor 50, and the third reactor 52 are all high power reactors, and that are the passive electronic elements capable of storing electrical energy in an AC self-induced energy approach. When a current having an electrical field passes through, AC self-induced energy can be generated in a direction to the right of flowing current.

The first DC reactor 28, the second DC reactor 30, the first reactor 48, the second reactor 50, and the third reactor 52 are each provided with an iron core and a coil. The iron core is made of a silicon steel plate, to increase its resistance, reduce its coercive force, and improve its magnetic stability, so as to raise saturation density of its magnetic flux.

The first DC reactor 28, the second DC reactor 30, the first reactor 48, the second reactor 50, and the third reactor 52 can be a wire-winding inductor, a stack-layer inductor, a thin-film inductor, or a ferrite inductor. When a ferrite inductor is selected to use for the first DC reactor 28, the second DC reactor 30, the first reactor 48, the second reactor 50, and the third reactor 52, it can achieve the maximum conversion of DC current.

The rectifier circuit 24 includes: the first diode 54 to the sixth diode 64. Wherein, the first diode 54 is provided with a first anode A1 and a first cathode K1, with the first, anode A1 connected electrically to the third R phase. The second diode 56 is provided, with a second anode A2 and a second cathode K2, with the second cathode K2 connected electrically to the first anode A1 and the third R phase. The third diode 58 is provided with a third anode A3 and a third cathode K3, with the third anode A3 connected electrically to the third S phase, and the third cathode K3 connected electrically to the first cathode K1. The fourth diode 60 is provided with a fourth anode A4 and a fourth cathode K4, with the fourth anode A4 connected electrically to the second anode A2, and the fourth cathode K4 connected electrically to the third anode A3 and the third S phase. The fifth diode 62 is provided with a fifth anode A5 and a fifth cathode K5, with the fifth anode A5 connected electrically to the third T phase, and the fifth cathode K5 connected electrically to the third cathode K3 and the power regulating capacitor 26. The sixth diode 64 is provided with a sixth anode A6 and a sixth cathode K6, with the sixth anode A6 connected electrically to the fourth anode A4 and the power regulating capacitor 26, the sixth cathode K6 connected electrically to the fifth anode A5 and the third T phase. In the descriptions mentioned above, the first diode 54, the second diode 56, the third diode 58, the fourth diode 60, the fifth diode 62, and the sixth diode 64 are all high power diodes.

Figure 2:
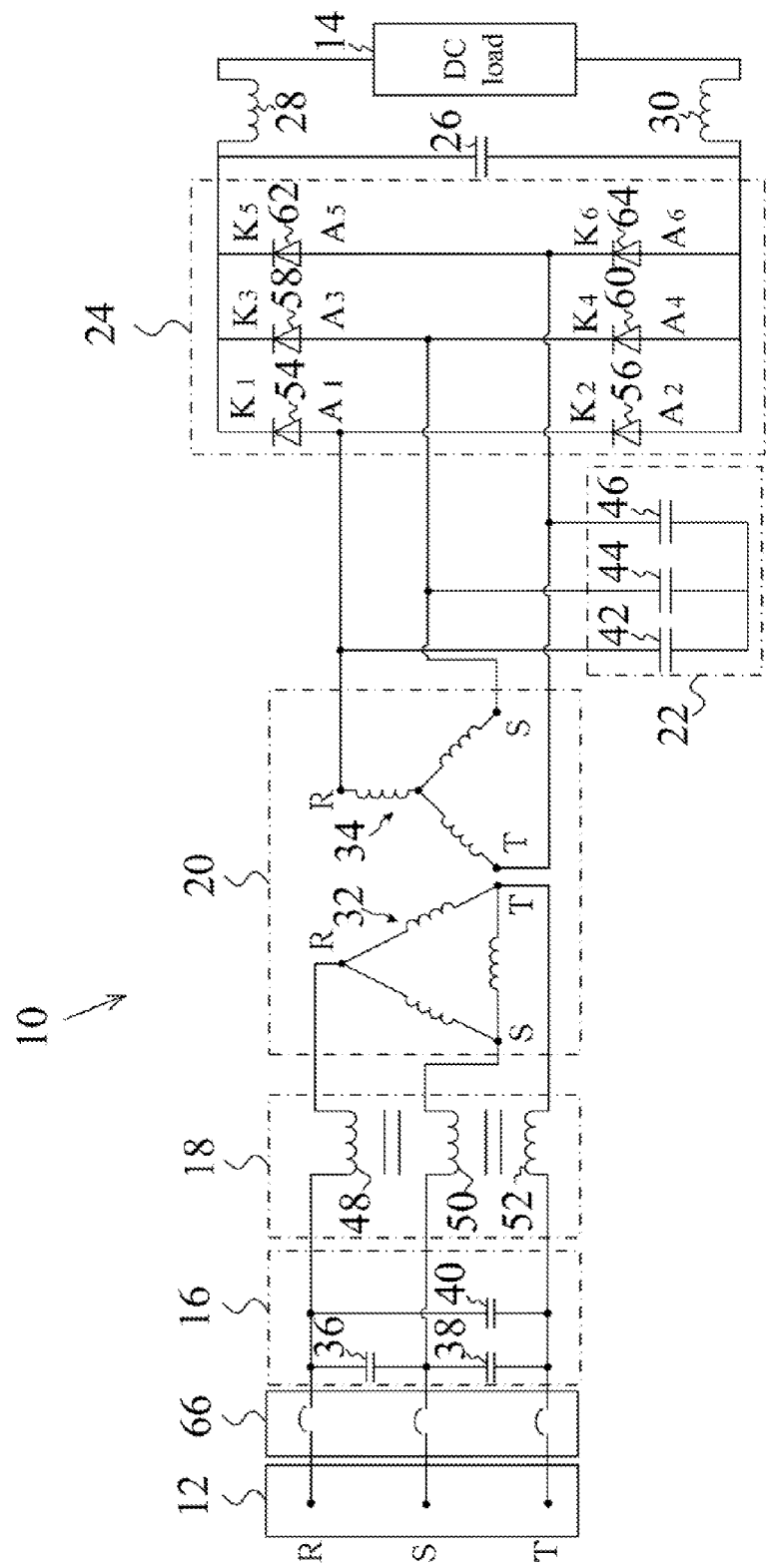
FIG. 2 is a circuit diagram of a three-phase reactor power saving device with an added circuit breaker according to an embodiment of the present invention.

Then, refer to FIG. 2 for a circuit diagram of a three-phase reactor power saving device with an added circuit breaker according to an embodiment of the present invention. As shown in FIG. 2, a circuit breaker 66 is connected electrically between the three-phase AC power supply 12 and the first capacitor set 16. Wherein, the circuit breaker 66 is an overcurrent protection device, used in a main switch or power distribution control switch in a household or industrial cabling, to protect effectively the load. Its main purpose is to prevent short circuit and overload. Also, for the load protection of industrial equipments, the circuit breaker is designated as an important protection device.

Figure 3:
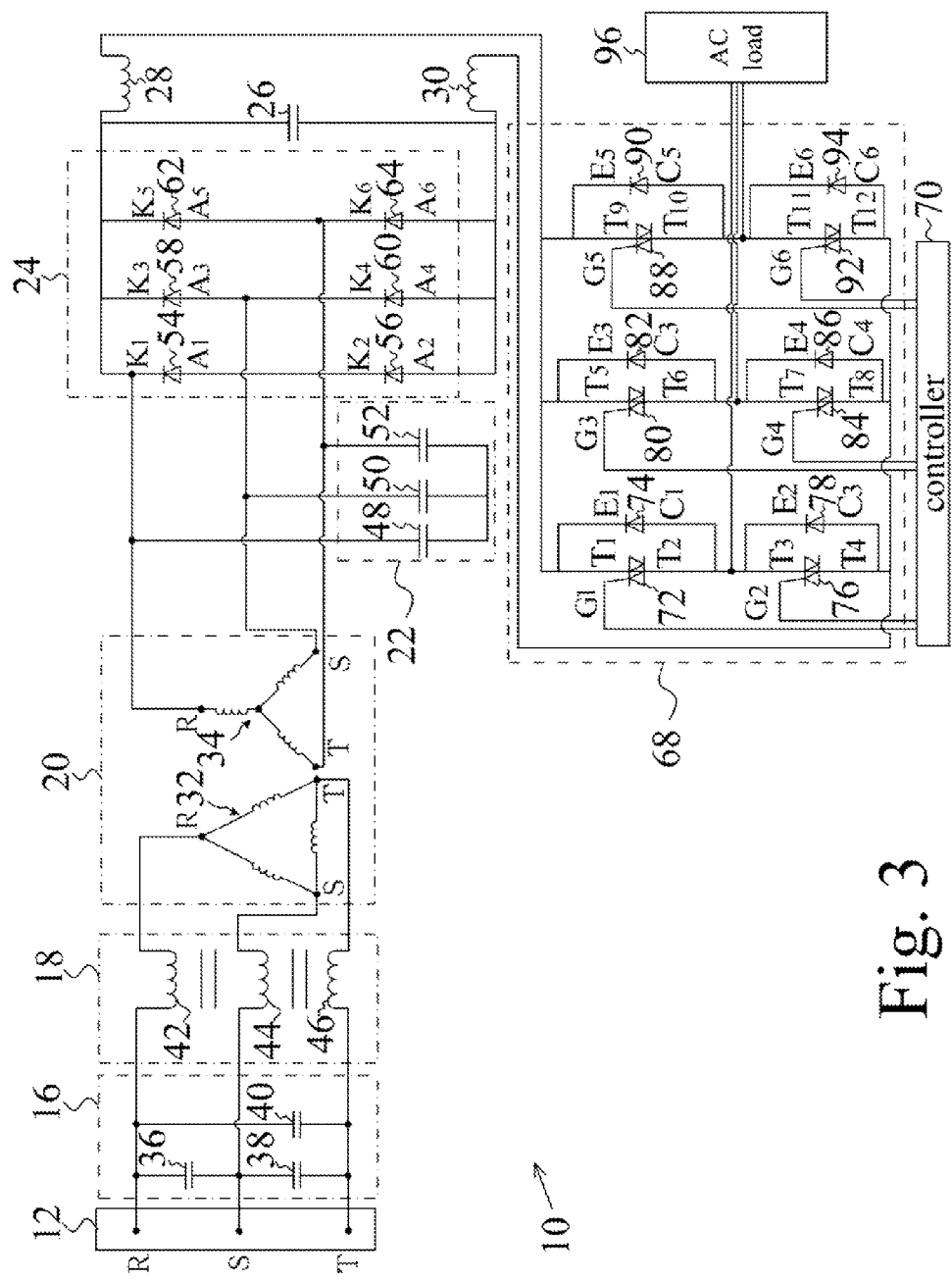
FIG. 3 is a circuit diagram of a three-phase reactor power saving device with an added three-phase inverter circuit according to an embodiment of the present invention.

Subsequently, refer to FIG. 3 for a circuit diagram of a three-phase reactor power saving device with an added three-phase inverter circuit according to an embodiment of the present invention. As shown in FIG. 3, a newly added three-phase inverter circuit 68 is connected electrically between the first DC reactor 28 and the second DC reactor 30, to receive and convert currents of the first DC self-induced energy and the second DC self-induced energy into a three-phase AC current. In addition, a controller 70 is connected electrically to the three-phase inverter circuit 68 to control the conditions of the three-phase inverter circuit 68.

In the descriptions mentioned above, the three-phase inverter circuit 68 includes: a first bi-directional Silicon Controlled Rectifier (SCR) 72 to a sixth bi-directional Silicon Controlled Rectifier (SCR) 92; and a first Insulated Gate Bipolar Transistor (IGBT) 74 to a sixth Insulated Gate Bipolar Transistor (IGBT) 94.

Wherein, the first bi-directional Silicon Controlled Rectifier (SCR) 72 is provided with a first terminal T1, a second terminal T2, and a first control gate GL with the first terminal T1 connected electrically to the first DC reactor 28.
The first Insulated Gate Bipolar Transistor (IGBT) 74 is provided, with a first emitter E1 and a first collector C1, with the first emitter E1 connected electrically to the first terminal T1, and the first collector C1 connected electrically to the second terminal T2. The second bi-directional Silicon Controlled Rectifier (SCR) 76 is provided with a third terminal T3, a fourth terminal T4, and a second control gate G2, with the third terminal T3 connected electrically to the second terminal 12, and the fourth terminal T4 connected electrically the second DC reactor 30. The second Insulated Gate Bipolar Transistor (IGBT) 78 is provided with a second emitter E2 and a second collector C2, with the second emitter E2 connected electrically to the third terminal T3, and the second collector C2 connected electrically to the fourth terminal T4. The third bi-directional Silicon Controlled Rectifier (SCR) 80 is provided with a fifth terminal T5, a sixth terminal T6, and a third control gate G3, with the fifth terminal T5 connected electrically to the first DC reactor 28. The third Insulated Gate Bipolar Transistor (IGBT) 82 is provided with a third emitter E3 and a third collector C3, with the third emitter E3 connected electrically to the fifth terminal T5, and the third collector C3 connected electrically to the sixth terminal T6.

The fourth bi-directional Silicon Controlled Rectifier (SCR) 84 is provided with a seventh terminal T7, an eighth terminal T8, and a fourth control gate G4, with the seventh terminal T7 connected electrically to the sixth terminal T6, and the eighth terminal T8 connected electrically to the second DC reactor 30. The fourth Insulated Gate Bipolar Transistor (IGBT) 86 is provided with a fourth emitter E4 and a fourth collector C4, with the fourth emitter E4 connected electrically to the seventh terminal T7, and the fourth collector C4 connected electrically to the eighth terminal T8. The fifth bi-directional Silicon Controlled Rectifier (SCR) 88 is provided with a ninth terminal T9, an tenth terminal T10, and a fifth, control gate G5, with the ninth terminal T9 connected electrically to the first DC reactor 28. The fifth Insulated Gate Bipolar Transistor (IGBT) 90 is provided with a fifth emitter E5 and a fifth collector C5, with the fifth emitter E5 connected electrically to the ninth terminal T9, and the fifth collector C5 connected electrically to the tenth terminal T10. The sixth bi-directional Silicon Controlled Rectifier (SCR) 92 is provided with an eleventh terminal T11, a twelfth terminal T12, and a sixth control gate G6, with the eleventh terminal T11 connected electrically to the tenth terminal. T10, and the twelfth terminal T12 connected electrically to the second DC reactor 30. The sixth insulated Gate Bipolar Transistor (IGBT) 94 is provided with a sixth emitter B6 and a sixth collector C6, with the sixth emitter E6 connected electrically to the eleventh terminal T11, and the sixth collector C6 connected electrically to the twelfth terminal T12.

In the description mentioned above, the first control gate G1, the second control gate G2, the third control gate G3, the fourth control gate G4, the fifth control gate G5, and the sixth control gate G6 are all connected electrically to the controller 70.

The load mentioned above is an AC load 96, connected electrically to the second terminal T2, the sixth terminal T6, and the tenth terminal T10 to form a loop, such that the AC load 96 is able to receive the three-phase AC current. The AC load 96 can be a resistive load, an inductive load, or a capacitive load. Wherein, the resistive load is for example, an incandescent light, or an electric-heat filament; the inductive load is for example an electric-magnetic equipment, such as a three-phase AC motor, a three-phase transformer, or an inductor; and the capacitive load is for example a capacitor.

Therefore, in the present invention, through an added three-phase inverter circuit 68, the three-phase reactor power saving device 10 can be applied to the AC load 96, such as the AC motor.

Based on the technical characteristics as disclosed in FIGS. 1, 2, and 3, the three-phase reactor power saving device 10 is indeed capable of saving power. It can further decrease power consumption of the load, reduce the capacity required, for the power input device of a load. Meanwhile, it can decrease compensation power for the circuit current, and enhance optimization of the reactor rectification. Moreover, it can lower impedance of a circuit, raise the overall performance of the load. Since the circuit current is decreased, thus the voltage drop is reduced, so it can provide more stable power, reduce equipment cost, and prolong its service life. When the three-phase reactor power saving device is placed close to the main switch, it power supply efficiency is increased, in case it is used in a switch of power distribution panel to match with the load, its voltage conversion rate is improved, and the power factor of the entire power supply is raised. Most of the power monitoring system is equipped with an automatic control power factor regulator. The three-phase reactor power saving device 10 of the present invention is capable of meeting the power factor specifications of Power Company, that its power factor not lower than 80% of current lagging power factor.

When the AC load 96 is an induction motor, an air gap exists between stator and rotor of the induction motor, to avoid their being blocked by the friction caused by difference of rotation speeds. For that will generate excitation current after the load is connected, to lower the power factor. In this condition, it is even more suitable to use the three-phase reactor power saving device 10 of the present invention, to integrate power supply systems of various functions, such as active power filter (APF) and power factor corrector (PFC), to provide DC driving power, and improve power supply quality to achieve power saving.

In case the three-phase reactor power saving device 10 is additionally equipped with a first capacitor set 16 and a second capacitor set 22, then can offset a part of the reactive power (KVAR), raise the active power (KW), increase power factor (PF), and reduce the total power consumption (KVA), so that it can be used widely in various industrial equipments and household appliances to save power.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A three-phase reactor power saving device, used to receive a three-phase AC power supply, and is connected electrically to a load, said three-phase AC power supply carries with it electric energy, comprising:
   a first capacitor set, connected electrically to said three-phase AC power supply in a delta configuration, to store said electric energy;
   a reactor set, connected electrically to said first capacitor set, to receive and convert said electric energy into AC self-induced energy;
   a three-phase transformer having delta connected primary windings connected electrically to said reactor set and wye connected secondary windings to receive and boost said AC self-induced energy into boosted AC self-induced energy;
   a second capacitor set, connected electrically to said wye connected secondary windings of said three-phase transformer, to store said boosted AC self-induced energy, said second capacitor set being in a wye configuration;
   a rectifier circuit, connected electrically to said wye connected secondary windings of said three-phase transformer, to rectify a current of said boosted AC self-induced energy into a DC current;
   a power regulating capacitor, connected electrically to said rectifier circuit, to store power of said DC current; and
   a first DC reactor and a second DC reactor, connected electrically to said rectifier circuit to receive said DC current, and generate and output first DC self-induced energy and second DC self-induced energy to said load.

2. The three-phase reactor power saving device as claimed in claim 1, wherein
   said load is a DC load, connected electrically to said first DC reactor and said second DC reactor to form a loop, said DC load receives said first DC self-induced energy and said second DC self-induced energy.

3. The three-phase reactor power saving device as claimed in claim 2, wherein
   said DC load is a resistive load, an inductive load, or a capacitive load.

4. The three-phase reactor power saving device as claimed in claim 1, wherein
   said three-phase AC current is provided with a first R phase, a first S phase, and a first T phase.

5. The three-phase reactor power saving device as claimed in claim 4, wherein
   said first capacitor set including:
   a first capacitor, connected electrically to said first R phase and said first S phase;
   a second capacitor, connected electrically to said first S phase and said first T phase; and
   a third capacitor, connected electrically to said first S phase and said first T phase.

6. The three-phase reactor power saving device as claimed in claim 5, wherein
   said delta connected primary windings have a second R phase, a second S phase, and a second T phase, while
   said wye connected secondary windings have a third R phase, a third S phase, and a third T phase.

7. The three-phase reactor power saving device as claimed in claim 6, wherein
   said reactor set including:
   a first reactor, connected electrically to said first capacitor, said third capacitor, and said second R phase;
   a second reactor, connected electrically to said first capacitor, said second capacitor, and said second S phase; and
   a third reactor, connected electrically to said second capacitor, said third capacitor, and said second T phase.

8. The three-phase reactor power saving device as claimed in claim 6, wherein
   said second capacitor set includes:
   a fourth capacitor having one lead connected electrically to said third R phase;
   a fifth capacitor having one lead connected electrically to said third S phase; and
   a sixth capacitor having one lead connected electrically to said third T phase, each of the fourth, fifth and sixth capacitors having another respective lead commonly connected together.

9. The three-phase reactor power saving device as claimed in claim 6, wherein
   said rectifier circuit includes:
   a first diode, provided with a first anode and a first cathode, said first anode is connected electrically to said third R phase;
   a second diode, provided with a second anode and a second cathode, said second cathode is connected electrically to said first anode said third R phase;
   a third diode, provided with a third anode and a third cathode, said third anode is connected electrically to said third S phase, and said third cathode is connected electrically to said first cathode;
   a fourth diode, provided with a fourth anode and a fourth cathode, said fourth anode is connected electrically to said second anode, and said fourth cathode is connected electrically to said third anode and said third S phase;
   a fifth diode, provided with a fifth anode and a fifth cathode, said fifth anode is connected electrically to said third T phase, and said fifth cathode is connected electrically to said third cathode and said power regulating capacitor; and
   a sixth diode, provided with a sixth anode and a sixth cathode, said sixth anode is connected electrically to said fourth anode and said power regulating capacitor, and said sixth cathode is connected electrically to said fifth anode and said third T phase.

10. The three-phase reactor power saving device as claimed in claim 1, wherein
said three-phase transformer is provided with an iron core and a coil, said iron core is made of a silicon steel plate.

11. The three-phase reactor power saving device as claimed in claim 7, wherein
said first reactor, said second reactor, said third reactor, said first DC reactor, and said second DC reactor are all high power reactors.

12. The three-phase reactor power saving device as claimed in claim 7, wherein
said first reactor, said second reactor, said third reactor, said first DC reactor, and said second DC reactor are each a wire-winding inductor, a stack-layer inductor, a thin-film inductor, or a ferrite inductor.

13. The three-phase reactor power saving device as claimed in claim 7, wherein
said first reactor, said second reactor, said third reactor, said first DC reactor, said second DC reactor are each provided with said iron core and said coil, said iron core is made of said silicon steel plate.

14. The three-phase reactor power saving device as claimed in claim 8, wherein
said first capacitor, said second capacitor, said third capacitor, said fourth capacitor, said fifth capacitor, and said sixth capacitor are all power capacitors.

15. The three-phase reactor power saving device as claimed in claim 1, further comprising: a circuit breaker, connected electrically to said three-phase AC power supply and said first capacitor set.

16. The three-phase reactor power saving device as claimed in claim 1, further comprising:
a three-phase inverter circuit, connected electrically to said first DC reactor and said second DC reactor, to receive and convert currents of said first DC self-induced energy and said second DC self-induced energy into a third AC current; and
a controller, connected electrically to said three-phase inverter circuit, to control conditions of said three-phase inverter circuit.

17. The three-phase reactor power saving device as claimed in claim 16, wherein
said three-phase inverter circuit includes:
a first bi-directional Silicon Controlled Rectifier (SCR), provided with a first terminal, a second terminal, and a first control gate, with said first terminal connected electrically to the first DC reactor;
a first Insulated Gate Bipolar Transistor (IGBT), provided with a first emitter and a first collector, with said first emitter connected electrically to said first terminal, and said first collector connected electrically to said second terminal;
a second bi-directional Silicon Controlled Rectifier (SCR), provided with a third terminal, a fourth terminal, and a second control gate, with said third terminal connected electrically to said second terminal, and said fourth terminal connected electrically said second DC reactor;
a second Insulated Gate Bipolar Transistor (IGBT), provided with a second emitter and a second collector, with said second emitter connected electrically to said third terminal, and said second collector connected electrically to said fourth terminal;
a third bi-directional Silicon Controlled Rectifier (SCR), provided with a fifth terminal, a sixth terminal, and a third control gate, with said fifth terminal connected electrically to said first DC reactor;
a third Insulated Gate Bipolar Transistor (IGBT), provided with a third emitter and a third collector, with said third emitter connected electrically to said fifth terminal, and said third collector connected electrically to said sixth terminal;
a fourth bi-directional Silicon Controlled Rectifier (SCR), provided with a seventh terminal, an eighth terminal, and a fourth control gate, with said seventh terminal connected electrically to said sixth terminal, and said eighth terminal connected electrically to said second DC reactor;
a fourth Insulated Gate Bipolar Transistor (IGBT), provided with a fourth emitter and a fourth collector, with said fourth emitter connected electrically to said seventh terminal, and said fourth collector connected electrically to said eighth terminal;
a fifth bi-directional Silicon Controlled Rectifier (SCR), provided with a ninth terminal, a tenth terminal, and a fifth control gate, with said ninth terminal connected electrically to said first DC reactor;
a fifth Insulated Gate Bipolar Transistor (IGBT), provided with a fifth emitter and a fifth collector, with said fifth emitter connected electrically to said ninth terminal, and said fifth collector connected electrically to said tenth terminal;
a sixth bi-directional Silicon Controlled Rectifier (SCR), provided with an eleventh terminal, a twelfth terminal, and a sixth control gate, with said eleventh terminal connected electrically to said tenth terminal, and said twelfth terminal connected electrically to said second DC reactor; and
a sixth Insulated Gate Bipolar Transistor (IGBT), provided with a sixth emitter and a sixth collector, with said sixth emitter connected electrically to said eleventh terminal, said sixth collector connected electrically to said twelfth terminal; and said first control gate, said second control gate, said third control gate, said fourth control gate, said fifth control gate, and said sixth control gate are all connected electrically to said controller.

18. The three-phase reactor power saving device as claimed in claim 17, wherein
said load is an AC load, connected electrically to said second terminal, said sixth terminal, and said tenth terminal to form a loop, said AC load receives said three-phase AC current.

19. The three-phase reactor power saving device as claimed in claim 18, wherein
said AC load is a resistive load, an inductive load, or a capacitive load.

* * * * *